Figure 1:
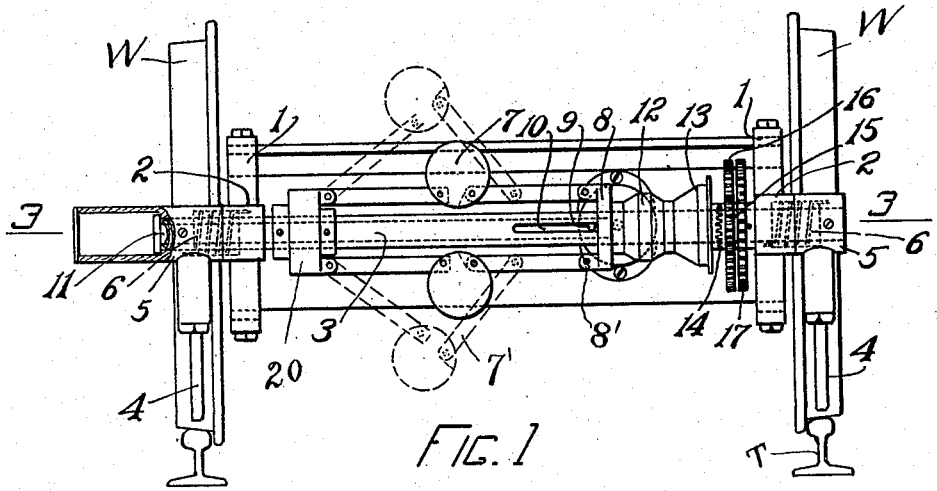

H. R. NEVENS.
TRAIN STOP DEVICE.
APPLICATION FILED APR. 12, 1912.

1,174,021.

Patented Feb. 29, 1916.

WITNESSES
R. B. Ellms.
Victoria Lowden

INVENTOR
HERBERT R. NEVENS
BY *Allis Spearf*
ATTY.

UNITED STATES PATENT OFFICE.

HERBERT R. NEVENS, OF HARTFORD, CONNECTICUT, ASSIGNOR TO NEVENS-WALLACE TRAIN CONTROL COMPANY, A CORPORATION OF MASSACHUSETTS.

TRAIN-STOP DEVICE.

1,174,021.  Specification of Letters Patent.  Patented Feb. 29, 1916.

Application filed April 12, 1912. Serial No. 690,448.

*To all whom it may concern:*

Be it known that I, HERBERT R. NEVENS, a citizen of the United States, residing at Hartford, county of Hartford, State of Connecticut, have invented certain new and useful Improvements in Train-Stop Devices, of which the following is a specification.

This invention relates to improvements in brake setting devices for railroad trains and like vehicles, and particularly to the actuation of air brake systems as employed by railroad trains.

My present invention consists of certain novel features of improvement for the devices set forth in my prior application Serial No. 634,010, filed June 19, 1911.

The object of my present invention is to provide for the more rapid actuation of the tripping mechanism and the improved operation of the air brake system at different speeds of the train to secure different degrees of brake application.

The principles of my invention will be more fully set forth in the specification which follows. In that specification I shall discuss more particularly a form of mechanism embodying my invention which I have found highly efficient. This form I have shown in the drawings, employing same reference numerals throughout specification and drawings to indicate corresponding parts.

Figure 2:
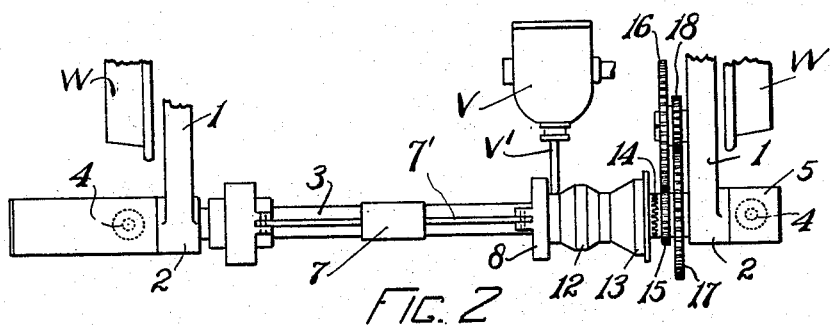
Figure 3:
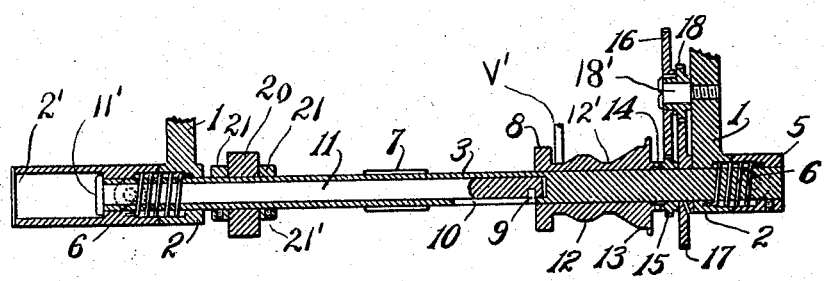

In the drawings: Figure 1 is a rear view of a truck equipped with my invention; Fig. 2 is a plan view of a portion of the same, and Fig. 3 is a sectional view of the portion of the apparatus shown in Fig. 2.

That portion of my device involved in my present invention, shown in the drawings above referred to, comprises brackets 1 which may be suitably attached to the truck frame, and having bearings 2, in which a shaft 3 is rotatably mounted. On each end of the shaft 3 is set an adjustable tripper-arm 4, so positioned as to lie exactly behind the wheel W over the track T. This tripper-arm 4 is to be actuated by any suitable tripping device, such as is illustrated in my prior application above mentioned.

On the shaft 3 is fixed a pinion 17 which meshes with a smaller pinion 18 loosely mounted on a stud 18'. The pinion 18 carries a larger pinion 16 which is geared back on to the smaller pinion 15 loose on the shaft 3. The gear train 17, 18, 16, 15, therefore constitutes a speeding-up set so that upon the rotation of the shaft 3 by the movement of the tripper 4, the loose pinion 15 will be given a very rapid rotation.

Slidably mounted on the shaft 3 is a cam member 8 and between the adjacent faces of this cam member 8 and the pinion 15 are suitable clutch teeth 14. The cam member 8 has a rise 12 followed by a drop 12' which in turn is succeeded by a second rise 13 of slightly larger radius.

The valve stem V' operates a valve V in the air brake system. The slide 8 is actuated by a centrifugal set consisting of weighted members 7 coupled by pivoted links 7'. These links at one end are pivoted to the slide 8 as indicated at 8' and at the opposite end to a sleeve 20, rotatably held between two fixed collars 21. The collars 21 are held on the shaft 3 by a set of screws 21'.

Within the shaft 3, which is hollow for a portion of its length, is a setting rod 11 which has its end 11' exposed within the open end 2' of one of the tripper hubs 5. When the slide 8 is thrown the end 11' is protruded from the hub 5 and the device can be reset by pushing in on this rod.

Spiral springs 6 are disposed about the shaft 3 and fastened on one end to the brackets 1 and at the other end to the tripper hub 5 so as to return the tripper arm immediately to its normal vertical position.

The operation of my device is as follows: When the tripper-arm 4 is struck by the tripping mechanism, the speeding-up gear train 17, 18, 16, 15, is rotated to give the slide member 8 a rapid rotation which actuates the centrifugal member 7 and causes the links to buckle as the weights 7 are thrown out. This draws the slide toward the sleeve 20 to a greater or less degree. If now the train has been approaching at reasonable speed, or cautiously, the slide 8 will be moved by the centrifugal system 7 just sufficiently to move the cam rise 12 past the valve stem V'. This opens the air brake system a slight amount in order to give a service application of the brakes. In such an application of the brakes, it is desired however that the system be again closed so as to retain a greater amount of the pressure. In this actuation, therefore, the adjustment is such that the valve stem V' riding over the cam rise 12 will reach the depression 12' which will again permit the closing of the system. On the other hand, if the train is running at full speed, the actuation of the tripper 4 will be more violent and the rotation of the slide 8 will be more rapid, thus throwing the ball 7 farther away from the center and drawing the slide 8 quickly on to the rise 13 which gives the emergency application and holds the air system open to assure the completion of the setting of the brakes as sharply as possible.

While I have discussed and claimed my invention in the terms of its application to the present railway system, it will be understood that it may be applied to any system of this nature and that the terms employed should be so construed.

Various modifications may obviously be made in the form of my device shown and in the manner of connection and operation, all without departing from the spirit of my invention if within the limits of the appended claims.

What I therefore claim and desire to secure by Letters Patent is:

1. In combination with the air brake system of a railroad train, a device operatively associated therewith independently of the engineer's valve of said system and including means for opening said system to a greater or less degree, means for holding said system open when opened to a greater degree, and means for closing it when opened to the less degree.

2. In combination with the air brake system of a railroad train, means for opening said system to a greater or less degree, means for holding said system open when opened to the greater degree, means for closing it when opened to the less degree, tripping means mounted on the train for effecting said actuation located behind a wheel, and means for governing said actuation according to the speed of the train.

3. In a device for automatically setting air brakes on a railroad train the combination of a valve for relieving the pressure on the train line pipe, a cam member comprising areas for opening and closing said valve for service application and an area for opening and holding open said valve for emergency application, a centrifugal device, operative connections between said centrifugal device and said cam member for operating the latter, and means for imparting to said centrifugal device a rotative tendency.

4. In a device for automatically setting air brakes on a railroad train the combination of a valve for relieving the pressure on the train line pipe, a shaft, a centrifugal device on said shaft, a slide on said shaft having areas for opening and closing said valve when actuated to a less degree and for opening said valve and holding it open when actuated to a greater degree, and operative connections between said centrifugal device and said slide for operating the latter.

5. In a device for automatically setting air brakes on a railroad train the combination of a valve for relieving the pressure on the train line pipe, a shaft, a centrifugal device on said shaft, a slide on said shaft having means for opening and closing said valve when actuated to a less degree and for opening and holding open said valve when actuated to a greater degree and operative connections between said centrifugal device and said slide for operating the latter, and a tripping arm on said shaft and located behind a wheel for imparting to said governor a rotative tendency.

6. In a device for automatically setting air brakes on a railroad train the combination of a valve for relieving the pressure on the train line pipe, a shaft, a centrifugal device on said shaft, operative connections between said centrifugal device and said valve for operating the latter, a tripping arm on said shaft and located behind a wheel for imparting to said centrifugal device a rotative tendency, and a speeding up gear train operatively interposed between said tripper and said centrifugal device.

7. In a device for automatically setting air brakes on a railroad train the combination of a valve for relieving the pressure on the train line pipe, a shaft, a cam slide on said shaft, a centrifugal device on said shaft, operative connections between said centrifugal device and said slide for operating the latter, a tripping arm on said shaft and located behind a wheel for imparting to said centrifugal device a rotative tendency, a speeding up gear train connected to said arm and a clutch between said gear train and said slide.

8. In a device for automatically setting air brakes on a railroad train the combination of a valve for relieving the pressure on the train line pipe, a shaft, a cam slide on said shaft, a centrifugal device on said shaft, operative connections between said centrifugal device and said slide for operating the latter, a tripping arm on said shaft and located behind a wheel for imparting to said centrifugal device a rotative tendency, a speeding up gear train operatively interposed between said arm and said centrifugal device connected to said arm, and a clutch between said gear train and said slide.

9. In a brake setting device, a centrifugal device rotatably supported on the train, a trip member movably supported on the train, a speeding up gear train operatively connected to said centrifugal device and actuated by said trip member.

10. In combination with a car brake system, a brake setting device comprising a centrifugal member, an actuating device for the brake system associated with said centrifugal member so as to be proportionately operated thereby, and means operable exteriorly of said car for imparting to said centrifugal device a speeding up rotative tendency.

11. In combination with the air brake system of a railroad train, a device governed by the speed of the train for its degree of actuation, said device including means for opening said system to a greater or less degree, means for holding said system open when opened to a greater degree, and means for closing it when opened to the less degree.

12. In combination with the relief valve of a braking system, an externally actuated trip member, a centrifugally acting control mechanism for said valve, and means positively connecting said trip member and control mechanism.

13. In combination with the relief valve of a braking system, an externally actuated trip member, a centrifugally acting control mechanism for actuating said valve in proportion to the train speed, and means positively connecting said trip member and control mechanism.

14. Automatic air brake mechanism for railroad trains comprising yielding tripping means adapted to be applied to the rail tread, and means on a train operable by said tripping means for causing the application of the brakes, said train supported means located over the rail and behind a wheel.

In testimony whereof I affix my signature in presence of two witnesses.

HERBERT R. NEVENS.

Witnesses:
JOSEPH BARR,
P. W. LYONS.

Copies of this patent may be obtained for five cents each, by addressing the "Commissioner of Patents, Washington, D. C."